US007044019B2

(12) United States Patent
Hauschopp et al.

(10) Patent No.: US 7,044,019 B2
(45) Date of Patent: May 16, 2006

(54) ACCELERATOR PEDAL

(75) Inventors: Marion Hauschopp, Ascheberg-Herbern (DE); Andre Baumeister, Ascheberg-Herbern (DE); Juergen Reich, Luenen (DE)

(73) Assignee: AB Elektronik GmbH, Werne (DE)

( * ) Notice: Subject to any disclaimer, the term of this patent is extended or adjusted under 35 U.S.C. 154(b) by 131 days.

(21) Appl. No.: 10/357,163

(22) Filed: Jan. 31, 2003

(65) Prior Publication Data

US 2003/0217614 A1 Nov. 27, 2003

(51) Int. Cl.
*G05G 1/14* (2006.01)
(52) U.S. Cl. .......................................... 74/512; 74/560
(58) Field of Classification Search ................. 74/478, 74/512, 513, 560; 180/334
See application file for complete search history.

(56) References Cited

U.S. PATENT DOCUMENTS 4,714,864 A * 12/1987 Yogo et al. ................... 318/52

FOREIGN PATENT DOCUMENTS

| DE | 38 09 910 | 10/1989 |
| DE | 298 05 253 | 9/1999 |
| DE | 102 11 018.2 | 3/2002 |
| EP | 0 427 097 | 5/1991 |

* cited by examiner

*Primary Examiner*—Vicky A. Johnson
(74) *Attorney, Agent, or Firm*—Milde & Hoffberg, LLP

(57) ABSTRACT

The invention relates to an accelerator pedal device that includes at least one pedal element that can be moved in relation to a base element, at least one retraction element, and at least one damper element that is used to dampen the pedal actuation movement and the pedal retraction movement of the pedal element, wherein the rotor of a motor unit is connected to the pedal element and a stator unit that is connected to the base unit, and wherein a clutch device is located between the motor unit and the pedal element, and the retraction unit includes a clutch cable and a motor cable, the pedal element is connected to the clutch cable and the motor unit to the motor cable.

24 Claims, 12 Drawing Sheets

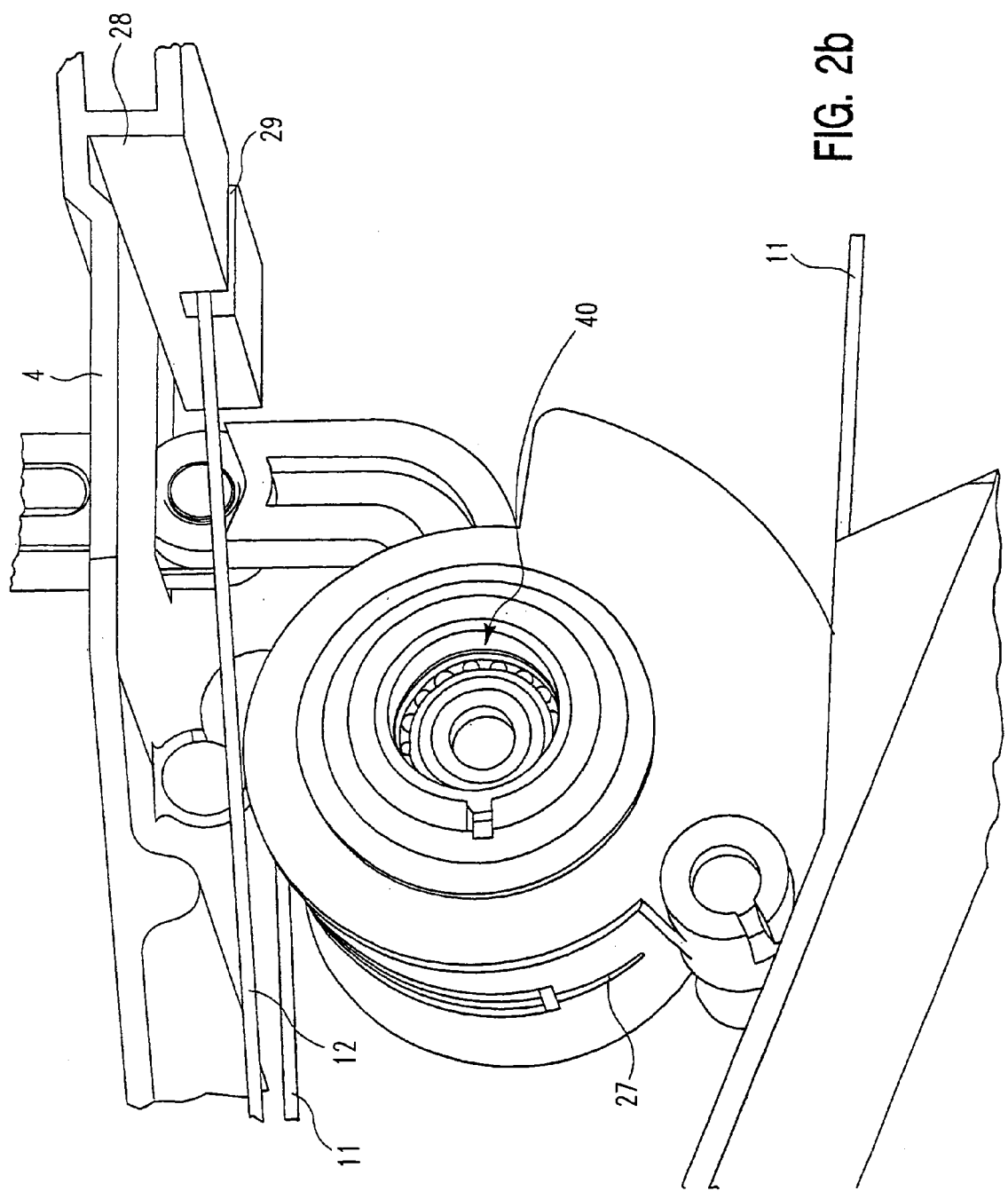

ACCELERATOR PEDAL

FIELD OF THE INVENTION

The invention relates to an accelerator pedal device that includes at least one pedal element that can be moved in relation to a base element, at least one retraction element, and at least one damper element that is used to dampen the pedal actuation movement and the pedal retraction movement of the pedal element.

BACKGROUND OF THE INVENTION

A device of the type mentioned above is disclosed in earlier filed patent application AZ: DE 102 11 018.2, where a pedal element can be moved in relation to a base unit and whereby at least one motor unit is provided, with the rotor unit of said motor unit connected to the pedal unit and the stator unit to the base unit. A retraction unit retracts the actuated pedal element. A damping of the pedal unit is accomplished using damper elements and the motor unit. However, if the motor unit jams, the pedal unit can no longer be actuated. The vehicle is unfit to drive.

An accelerator pedal device is disclosed in DE 298 05 253 U1, wherein a pedal element is connected to a piston rod of a piston of a hydraulic cylinder. The cylinder element is filled with a hydraulic liquid. A hydraulic line is connected to the cylinder element beyond the highest and lowest position of the piston. A hydraulic valve, controlled by a decision logic, is located in the hydraulic line. The decision logic is designed as a programmable computing unit. Connected to the microcomputer unit is a distance sensor. The valve is controlled corresponding to the distance measured by the sensor, which in turn controls the flow of the hydraulic oil.

Though opening the valve makes the actuation of the gas pedal element more difficult by the reduction of the flow rate of the hydraulic oil, the uniform rise of the required exertion of force is not sufficient to alert the motorist of a dangerous situation. In addition, the design of the accelerator pedal with the controllable hydraulic cylinder is too elaborate.

SUMMARY OF THE INVENTION

The present invention comprises an accelerator pedal device having a pedal element connected to a base unit, and at least one motor unit, with its rotor unit connected to the pedal element, and its stator unit connected to the base unit; and a clutch device, located between the motor unit and the pedal element. Addition of the clutch device allows the motor unit to be separated from the pedal unit, and still actuate the pedal element.

In one embodiment of the device of the present invention, the pedal element has an accelerator pedal element rotatably connected at the center of rotation of the accelerator pedal, to a base unit. The accelerator pedal element is also connected to a gas pedal lever element, which is connected to the actuation element of a clutch device, attached to the base unit at the center of rotation of the gas pedal, whereby a moveable and direct, force-locked connection is made from the accelerator pedal lever and the clutch. The accelerator pedal device also includes at least one retraction unit, and at least one damper element, used to dampen the pedal actuation movement and the pedal retraction movement of the pedal element.

The retraction unit may include at least one clutch cable and one motor cable. The pedal unit may be connected to the clutch cable and the motor unit to the motor cable such that the motor cable is de-coupled when the motor jams. Using a motor and a clutch cable meets the stringent regulations for the secure operation of the accelerator pedal device that require a redundant pedal retraction. However, by separating the two cables and the different linking of the cables, it is possible to continue to actuate the pedal element during a motor malfunction.

The clutch unit, located at the center of rotation of a gas pedal, is connected to the clutch cable, and the motor unit can be connected to the motor cable, such that the individual elements of the accelerator pedal device may be safely actuated.

The clutch unit may be designed as a locking clutch, pin coupling, motor clutch, multi-plate clutch, separator clutch or the like. In other words, during normal operation, the clutch unit consists of two elements that are held together to act as one. However, if required, e.g. during a motor jam, this cohesion of the two elements can be temporarily or permanently canceled.

If a locking clutch is used as a first clutch unit, it may consist of an actuation element with an actuation tooth system and a limp home disc with a limp home tooth system; the actuation element and the limp home disc may be moveable around a first sensor shaft that is located at the center of rotation of a gas pedal.

A pedal sensor unit can be located at the first sensor shaft. The pedal sensor unit has the task of transferring the position of the accelerator pedal to the damper flap device, such that each position of the accelerator pedal has a corresponding position of the damper flap, which in turn is used to move the vehicle accordingly.

The actuation element and the limp home disc can be compressed using a clutch spring unit. By compressing the two bodies, the tooth systems that are located opposite to one another are pressed together, which leads to a connection of the two elements. The spring force can be overcome if the motor unit is at a stand-still, with a higher actuation force of between 50 to 200 N, which produces a movement between the two elements. A preferred actuation force may be 150 N.

The clutch cable can be connected to the actuation element and the motor cable to the limp home disc.

If a second clutch unit is used, it may consist of a limp home object and an actuation element, which may be held together by at least one pin type unit. The pedal element can be releasably connected to the limp home object and the motor cable, through the actuation element.

The advantages achieved with the second clutch unit are that it is possible to separate the limp home object and the actuation object from each other by stepping more forcefully on the pedal element if the motor device jams during the travel. If the motor unit is at a standstill, a force between 50 and 200 N can be applied that disrupts the pin unit and thus, separates the two parts from each other. In this manner it is possible to again move one of the parts and continue to actuate the accelerator pedal. The vehicle can again be moved and driven to a shop. There, the damage can be corrected. Using a pin unit requires only a replacement of said pin unit. In place of one pin unit, it is also possible to use several of them. This allows for appropriate metering of the actuation force.

The pin unit can be provided with a predetermined breaking point region. This predetermined breaking point region determines the actuation force that needs to be applied for each pin unit.

The pin unit may consist of a pin body and a coupling pin element located in front of said pin body. An at least partially circumferential predetermined breaking opening can be inserted in the pin element as the predetermined breaking point region. This enables a targeted separation of the pin body.

The pin body can be arranged in the limp home object and the coupling pin element in the actuation element. A female coupling element can be arranged in the actuation element, where the coupling pin element is to be inserted. This enables the assembly and re-generation of the two bodies of the entire clutch unit.

The pedal element can consist of an accelerator pedal element with a gas lever element articulated between said accelerator pedal element and the limp home object. In this manner, the force is transferred quickly and effectively to the entire device when the accelerator pedal element is actuated. The actuation element may end in a clutch sensor shaft element that is connected to a pedal sensor unit.

The actuation element can be supported using a cup and support pin. The limp home object in turn can be arranged around the actuation element. This allows for a smooth and simple actuation when operating the entire device. Simple guiding of the limp home object around the actuation element is sufficient if the motor jams.

The clutch cable may be guided over at least one damper element. The clutch cable and the motor cable can each be connected to at least one spring element as an additional damper element. The damper elements have the purpose of providing a damper force that counters the accelerator pedal movement.

The active components such as the motor unit, the clutch unit, the clutch and motor cables, a first and a second spring element, and the pedal sensor unit may at least partially closed over by the floor plate. The base housing element may be, at least partially, closed over by a floor plate. The second motor unit may be installed in place of the first one. The floor plate ensures that the active components are protected from dirt and other outer influences.

A control unit connected to a sensor element may be provided to control the motor unit. The control sensor element may be designed as a sensor for various dangers. For example, the sensor may be a speed sensor, a distance sensor, a temperature sensor, or the like. It is also possible to connect all sensor models to the control unit. This increases the comfort of the smart accelerator pedal. In place of a sensor element, the signals may also be provided to the control unit by a super-ordinate unit, e.g., a driving dynamics computer.

The control unit may be a microcomputer unit with an E2PROM memory for entering the normal condition. The $E^2$PROM memory constitutes a read only memory with the attributes of a RAM with regard to overwrite ability. In this manner, it is possible to enter the various normal conditions. With regard to the readout of the written values for the normal condition, the $E^2$PROM acts like a read only memory ROM.

The normal conditions may be a prescribed speed limit, a prescribed safety distance, an ice-formation temperature or the like. The normal conditions are not limited to the three mentioned above.

The motor unit can be a torque motor that can be located at the center of rotation of the gas pedal, where its rotor unit is connected to the pedal element and its stator element is located in the base unit. The torque motor can be used as a motor without an intermediate gearing. By installing the torque motor for one at the center of rotation of the gas pedal and for another directly into the base unit, its effectiveness is increased and the overall design of the accelerator pedal is simplified.

It is the objective of this device to provide an advanced accelerator pedal device that may be operated in an emergency. The advantages achieved with the invention consist especially in that it will continue to be possible to move the accelerator pedal even when the motor jams. The vehicle can then be moved and driven to a shop, where the damage can be corrected. This is achieved through the provision of the clutch device, located between the motor unit and the pedal element, which allows for the motor unit to be separated from the pedal unit, and still actuate the pedal unit.

The torque motor may be designed as a twin torque motor. This motor develops the known properties of torque motors in a particularly outstanding manner.

For a full understanding of the present invention, reference should now be made to the following detailed description of the preferred embodiments of the invention as illustrated in the accompanying drawings.

BRIEF DESCRIPTION OF THE DRAWINGS

FIG. 2b shows the accelerator pedal of FIG. 2a with the pedal sensor unit removed to show clutch 40.

DESCRIPTION OF THE PREFERRED EMBODIMENTS

Figure 1:
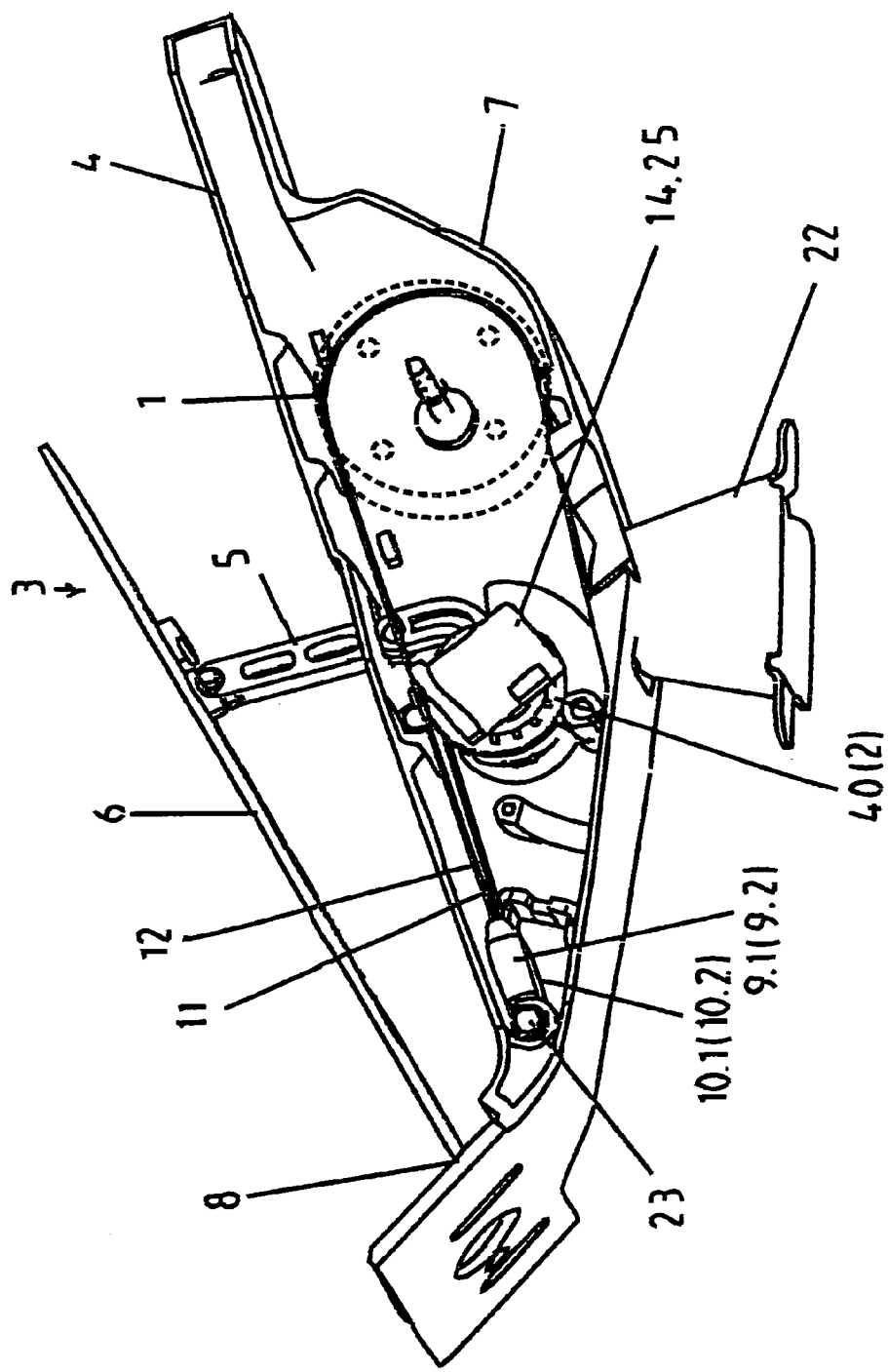
FIG. 1 shows a schematic, perspective, partially open view of an accelerator pedal with a built-in torque motor and a clutch unit.

The preferred embodiments of the present invention will now be described with reference to FIGS. 1–6b of the drawings. Identical elements in the various figures are designated with the same reference numerals.

Figure 2A:
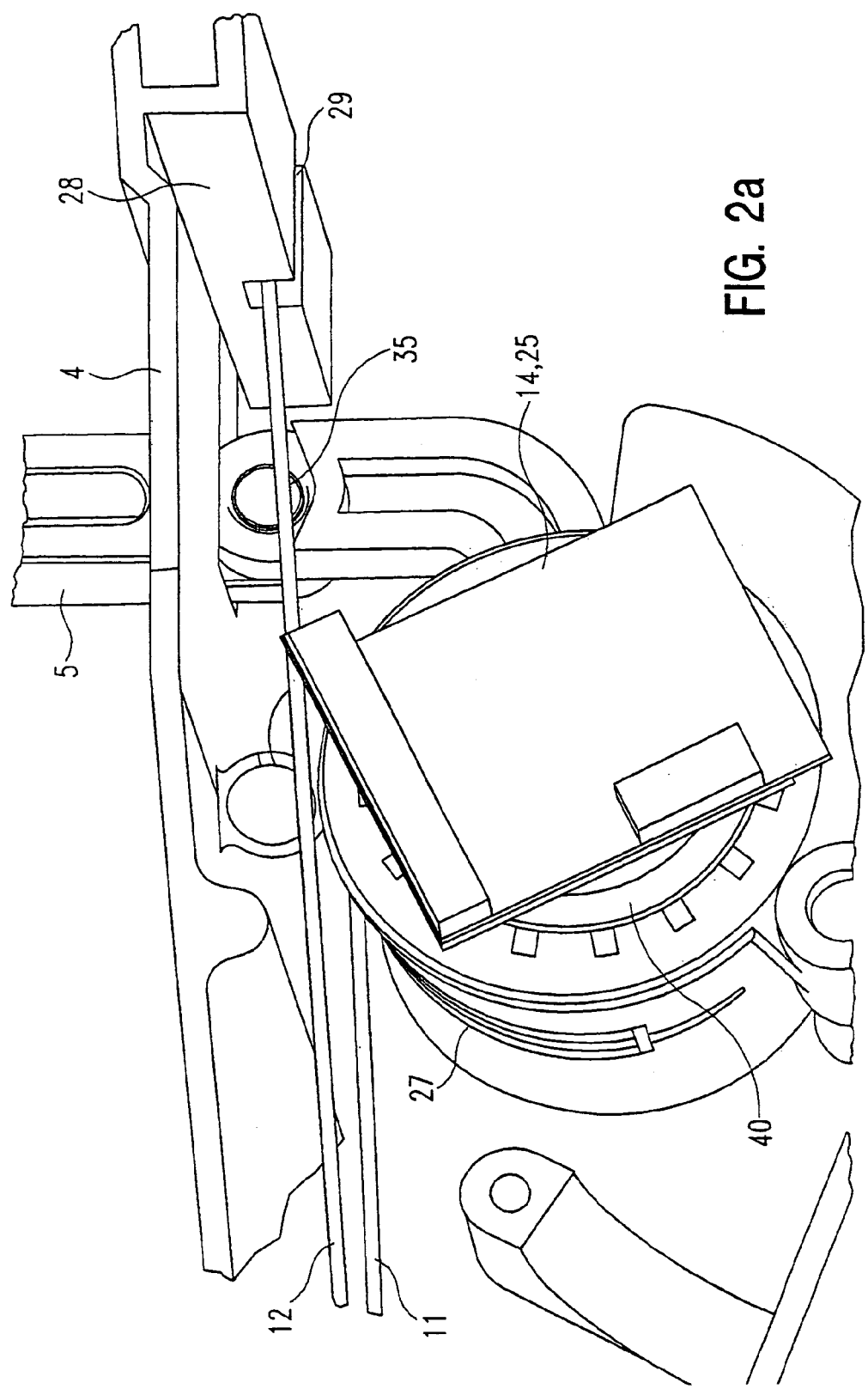
FIG. 2a shows an enlarged partial view of an accelerator pedal according to FIG. 1.
Figure 2C:
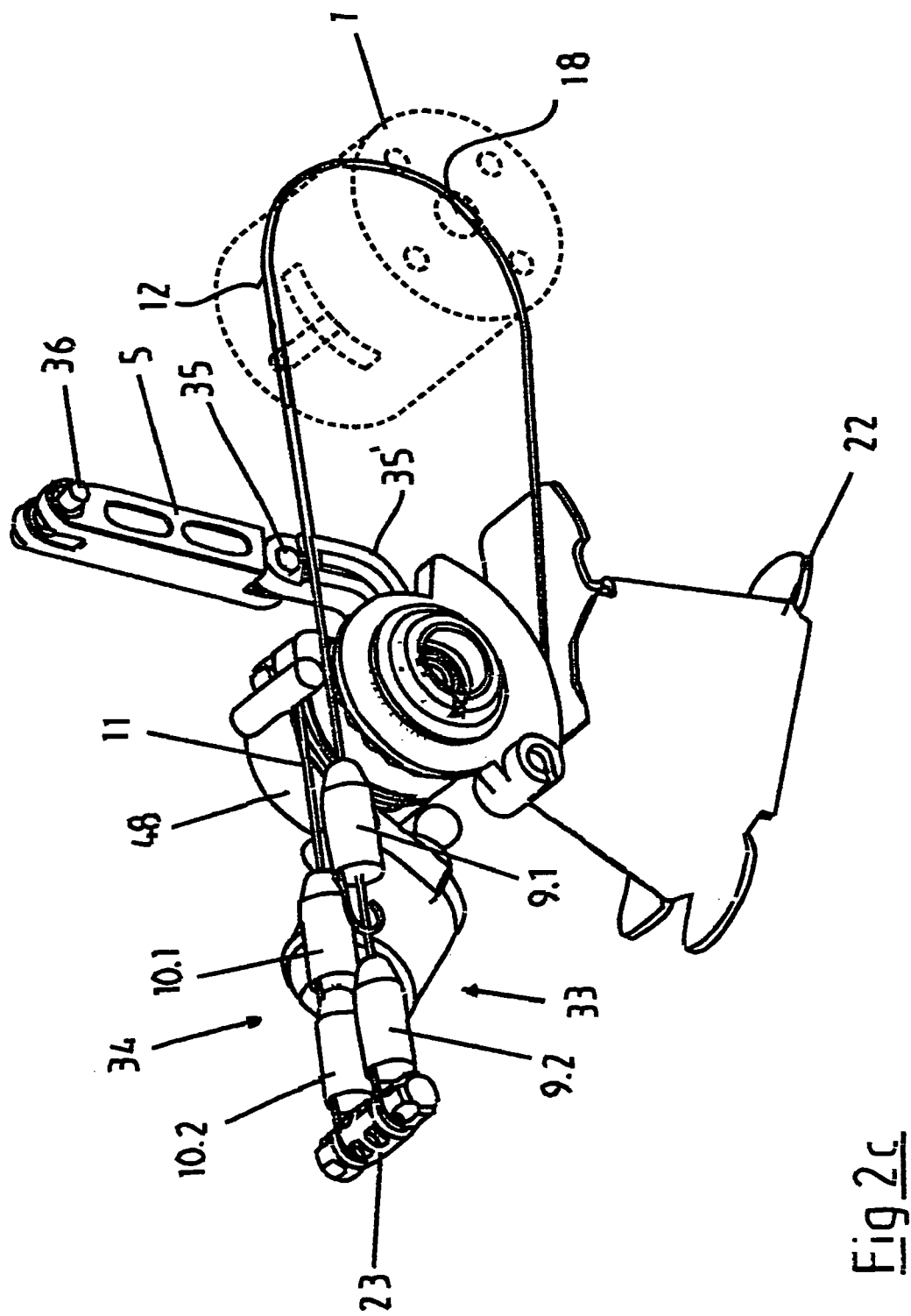
FIG. 2c shows a schematic of a top perspective view of the accelerator pedal according to FIG. 1.

FIGS. 1 through 2c show a smart accelerator pedal.

The accelerator pedal exhibits a pedal element 3 that can be moved in relation to a floor plate 4 through a rotatable connection at the center of rotation of the accelerator pedal.

The pedal element 3 consists of an accelerator pedal element 6 that is connected to a gas pedal lever element 5. The accelerator pedal element 6 is connected at a center of rotation 8 of an accelerator pedal, to the floor plate 4. The free end of the accelerator pedal element 6 extends beyond the gas pedal lever element 5. This ensures that the pedal lever element 5 is easily actuated by the accelerator pedal element 6 using the foot of the motorist.

The gas pedal lever element 5, and thus the accelerator pedal element 6, is always returned to its initial position by two pedal cables 11, 12 and retractor units 9.1, 9.2, and 10.1, 10.2, respectfully. The clutch cable 11 and a motor cable 12 acting as pedal cables are always pulled back each with the aid at least two spring elements 9.1, 9.2, 10.1, 10.2 of the retraction unit that are firmly attached to a spring support element 23 of the base unit.

Figure 6A:
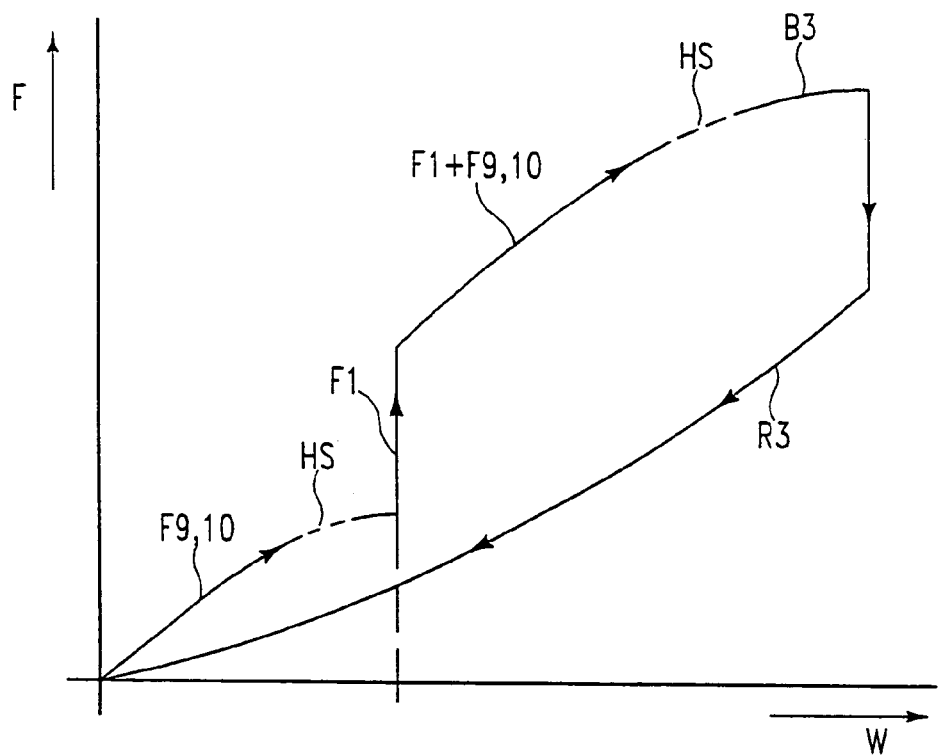
FIG. 6a is a schematic presentation of the profile of a pedal path of an actuated accelerator pedal element with a torque motor corresponding to the pedal path.

Damper element 27 is provided on actuation element 48, and the cable 11 is pulled across the damper element 27 providing the damping of the actuation of the pedal element 3. The damper elements, i.e., the springs and the damper element 27, generate a damping force F9,10 that counteracts the actuation motion of the motorist, as shown in FIG. 6a. The curve F9, 10 is slightly arched because of the braking force of the damper elements.

The damper element 27 may have rough surfaces across which the cable 11 is guided. The surfaces may exhibit varying roughnesses. As a result, a motion hysteresis is formed.

A floor housing element 7 is integral with the floor plate 4 (cf. particularly FIG. 1). A housing element base 22, is located at the floor housing element.

A clutch unit 40,140 is attached to, and located on the inside of, the floor housing element at the center of rotation 2 of the gas pedal 2. A torque motor 1 is positioned forward of the clutch unit 40,140. For illustration purposes only, axle, 18, of the torque motor, 1, is shown. The clutch cable 11 is guided by the clutch unit 40,140 and the motor cable 12 is guided by the torque motor 1. The motor cable ends at the clutch unit 40,140 as shown particularly in FIG. 2c.

As is shown particularly in FIG. 2a, the pedal sensor unit 25 is positioned on a sensor shaft 45,145, of the clutch unit 40,140. From the position of the sensor shaft 45,145 the pedal sensor unit generates a corresponding signal for subsequent processing. A computer unit 14 may be integrated into the pedal sensor unit.

The clutch cable 11 is guided in the clutch unit 40, 140 via the damper element that is shown as a groove. The motor cable 12, on the other hand, is guided with the aid of motor cable guide profile 28 that includes a guide slot 29 (cf. in particular FIG. 1 and FIG. 2a).

The torque motor 1 is located on the inside of the base housing element 7. This protects the torque motor and avoids damage when the foot of the driver actuates the accelerator pedal.

Figures 3A, 3B, 3C:
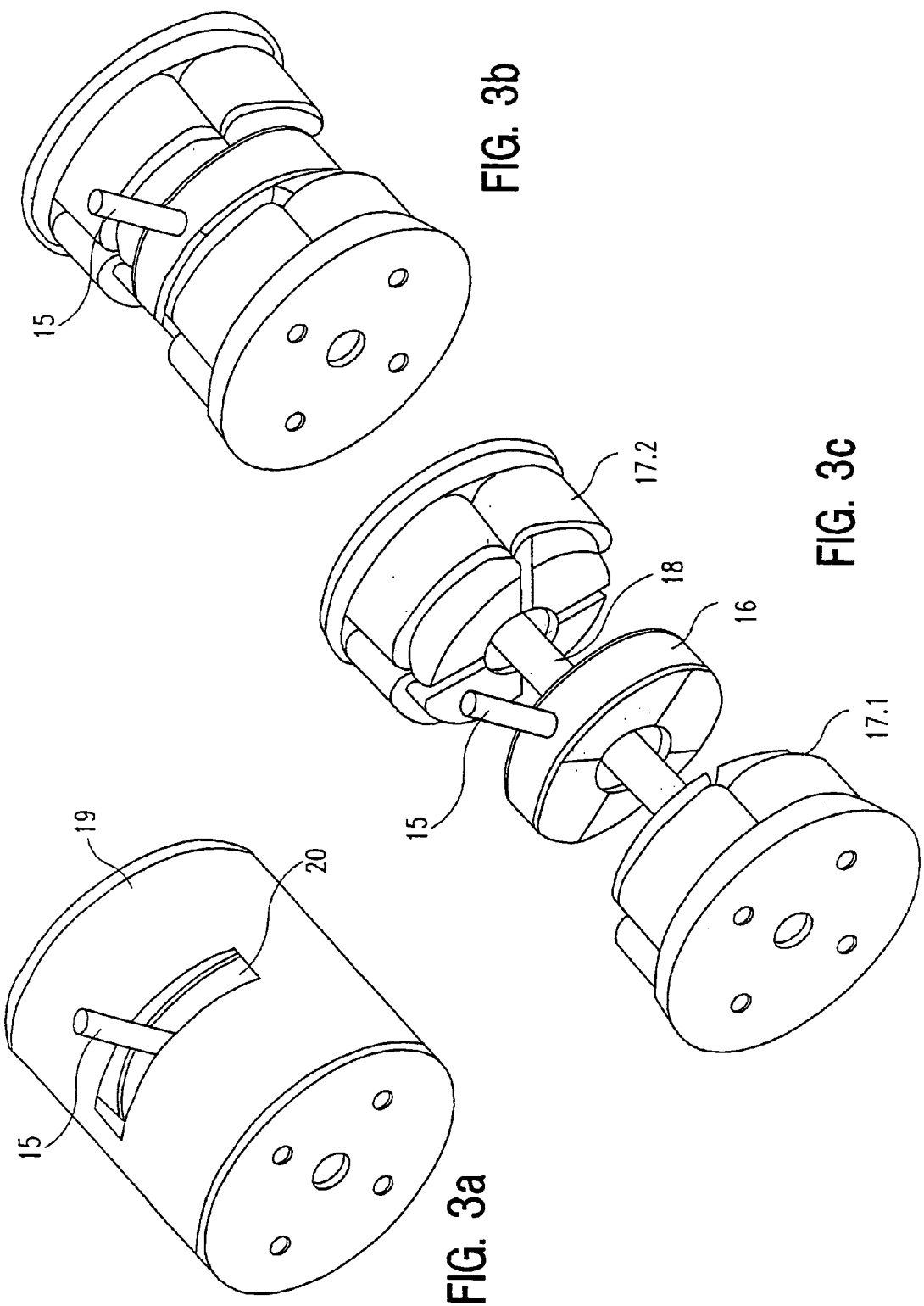
FIG. 3a is a schematic, perspective view of a torque motor according to the accelerator pedal of FIGS. 1 through 2c.
FIG. 3b is a schematic, perspective view of a torque motor according to FIG. 3a with the housing element removed.
FIG. 3c is a schematic, exploded, perspective presentation of a torque motor according to FIG. 3b.

The torque motor is shown in FIGS. 3a through 3c. As its rotor unit, it exhibits an annular, grooved torque motor rotor 16 with a large diameter. A motor peg 15 is located at the rotor 16. This peg connects the rotor to the pedal lever element 5.

The stator halves 17.1, and 17.2 are located to the left and the right respectively of the rotor 16. The rotor 16 moves between the two stator halves by means of a motor axle 18. The composite view of the torque motor 1 is shown in FIG. 3b.

As FIG. 3a shows, a housing element 19 is at least partially slid over the two stator halves 17.1, 17.2. A slot opening 20, where the motor peg 15 accordingly has free movement, is provided in the housing element 19.

The rotational speed range of the torque motor 1 is between 1 RPM and approx. 1,200 RPM, making it suitable for high torque direct connection without interim gearing.

The torque motor 1 is connected to the microcomputer unit 14 with an $E^2$PROM. In addition, a control sensor element 25 is located with the microcomputer unit 14. The control sensor element 25 can be designed as a speed sensor, a distance sensor, a temperature sensor or the like.

The clutch unit can be designed as clutch unit 40; or clutch unit 140 described below.

In FIG. 2c, the clutch unit 40 is shown in its assembled state and in FIGS. 4a through 4g in a partially disassembled condition.

The clutch unit 40 includes a limp home disc 41 with a limp home tooth system 42 affixed to it. Positioned on the disc 41 is a cable take-up body 44 that exhibits a motor cable opening 43 (cf. particularly FIGS. 4e, 4f and 4g.)

Figure 4A:
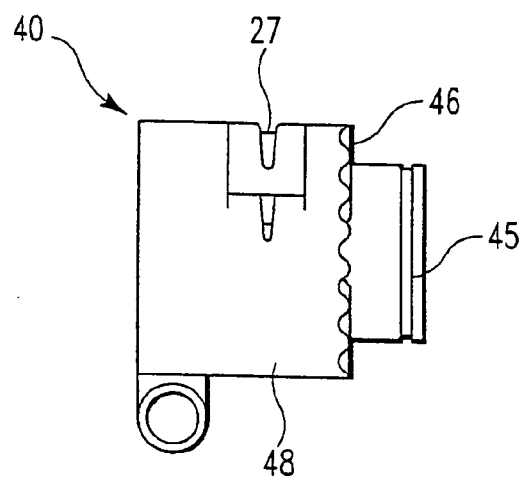
FIGS. 4a to 4g show exploded schematic partial presentations of a first embodiment of a clutch unit for an accelerator pedal with a torque motor according to FIGS. 1 through 2c.
Figure 4B:
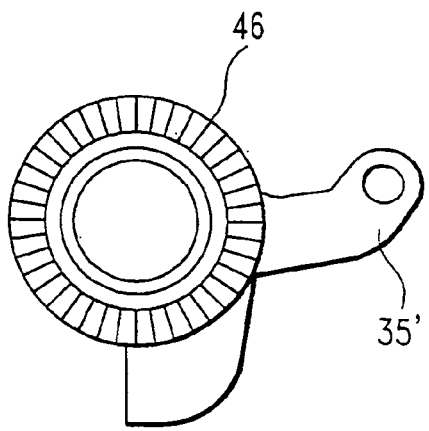
Figure 4C:
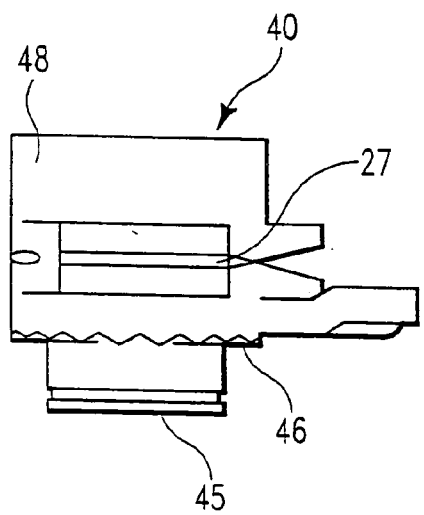
Figure 4D:
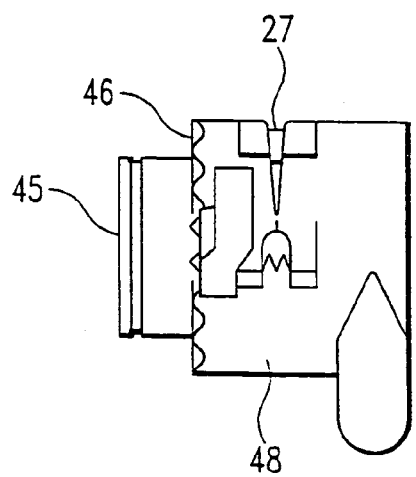
Figure 4F:
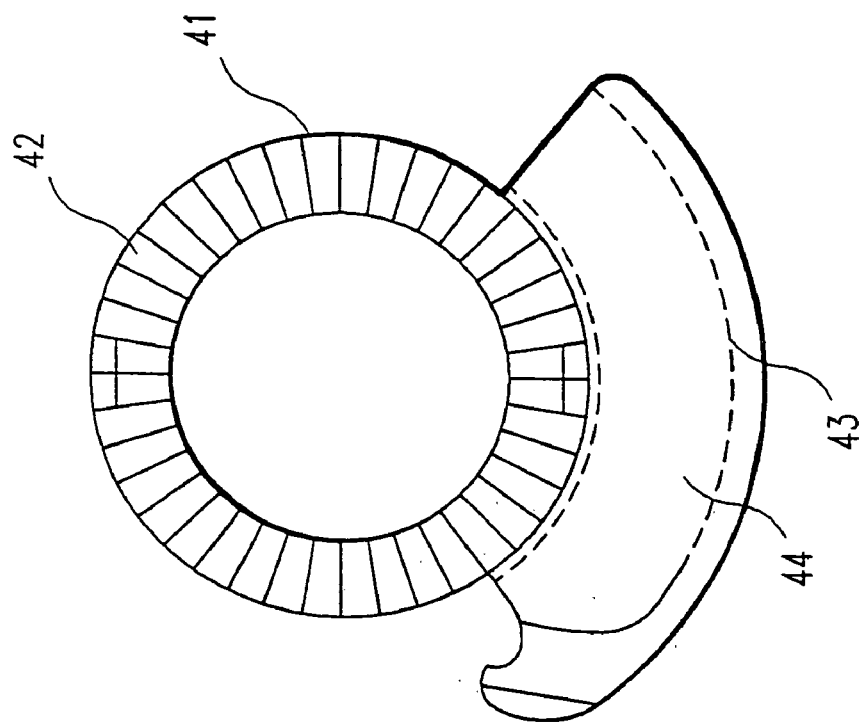
Figure 4E:
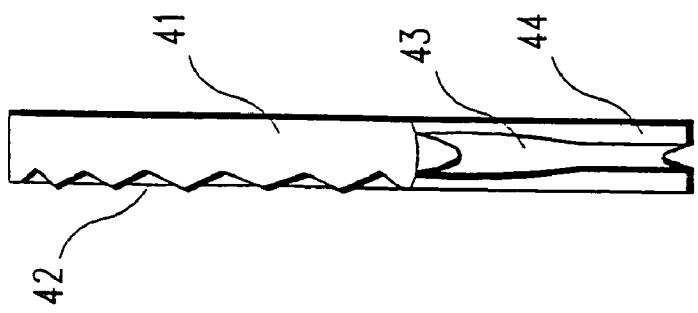
Figure 4G:
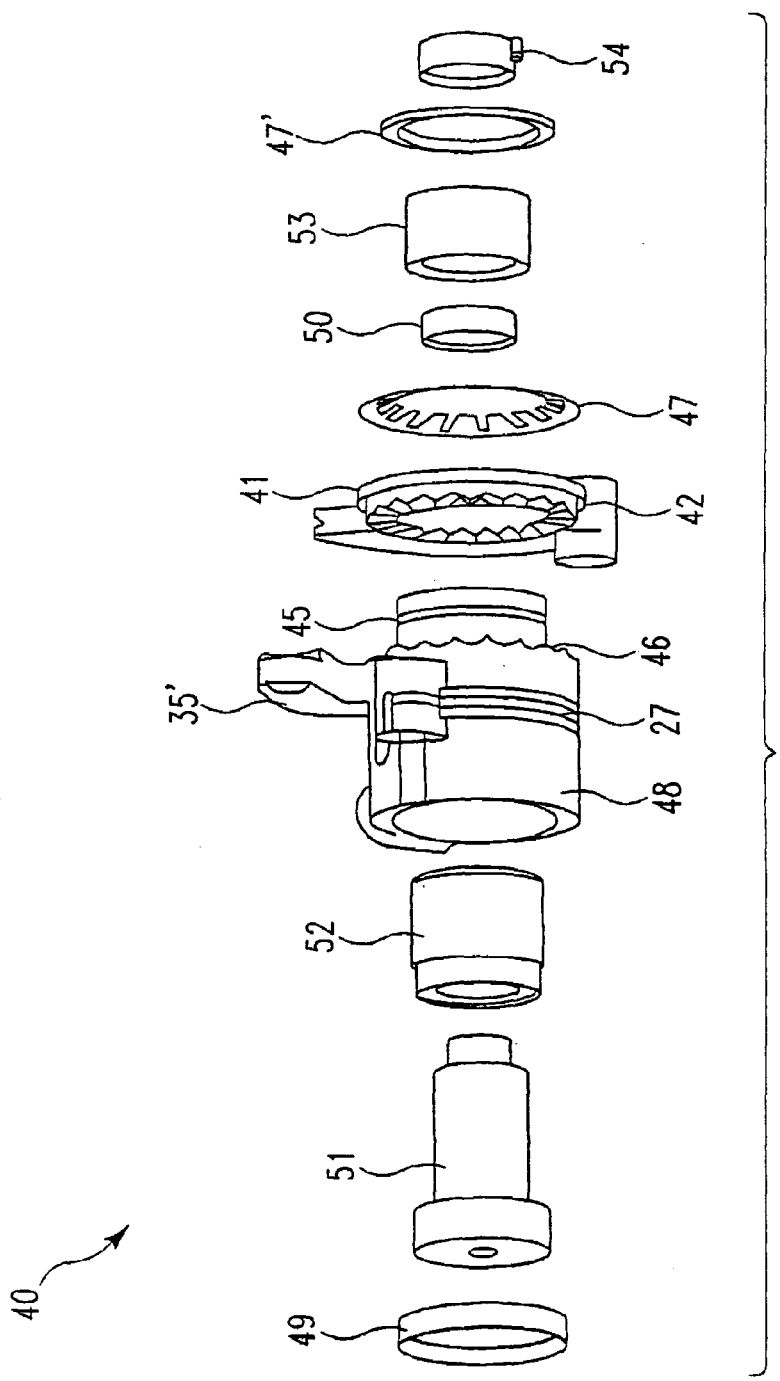

As FIGS. 4a and 4b show, the clutch unit 40 additionally exhibits an actuation element 48 that is provided with an actuation tooth system 46. The sensor shaft 45, on which the sensor unit 25 is located, protrudes from the actuation element 48. A drive lever 35' is located at the actuation element 48. In addition, the sensor shaft 45 forms the actuation shaft. The components of the clutch unit 40 are held together by a clutch spring unit 47, which is secured by a retaining ring 47'. Due to the fact that the limp home tooth system 42 and the actuation tooth system 46 are located opposite to each other, the limp home disc 41 and the actuation element 48 are pressed together in a rotation-proof manner by the clutch spring unit 47. A friction bushing 52 of the damper element 27 is located on the inside of the actuation element 48. A shaft 51 is supported by ball bearings 49, 50 (cf. FIG. 4g). Integrated in the clutch unit are a ring magnet receptacle 53 and a ring magnet 54 of the pedal sensor unit 25.

Connected to the accelerator pedal element 6 is the gas pedal lever element 5 as is shown particularly in FIG. 1. As shown in FIG. 2c. A motor peg 35 and a pedal peg 36 enable a moveable and direct, force-locked connection to the actuation element 48 of the clutch device 40.

Figure 5A:
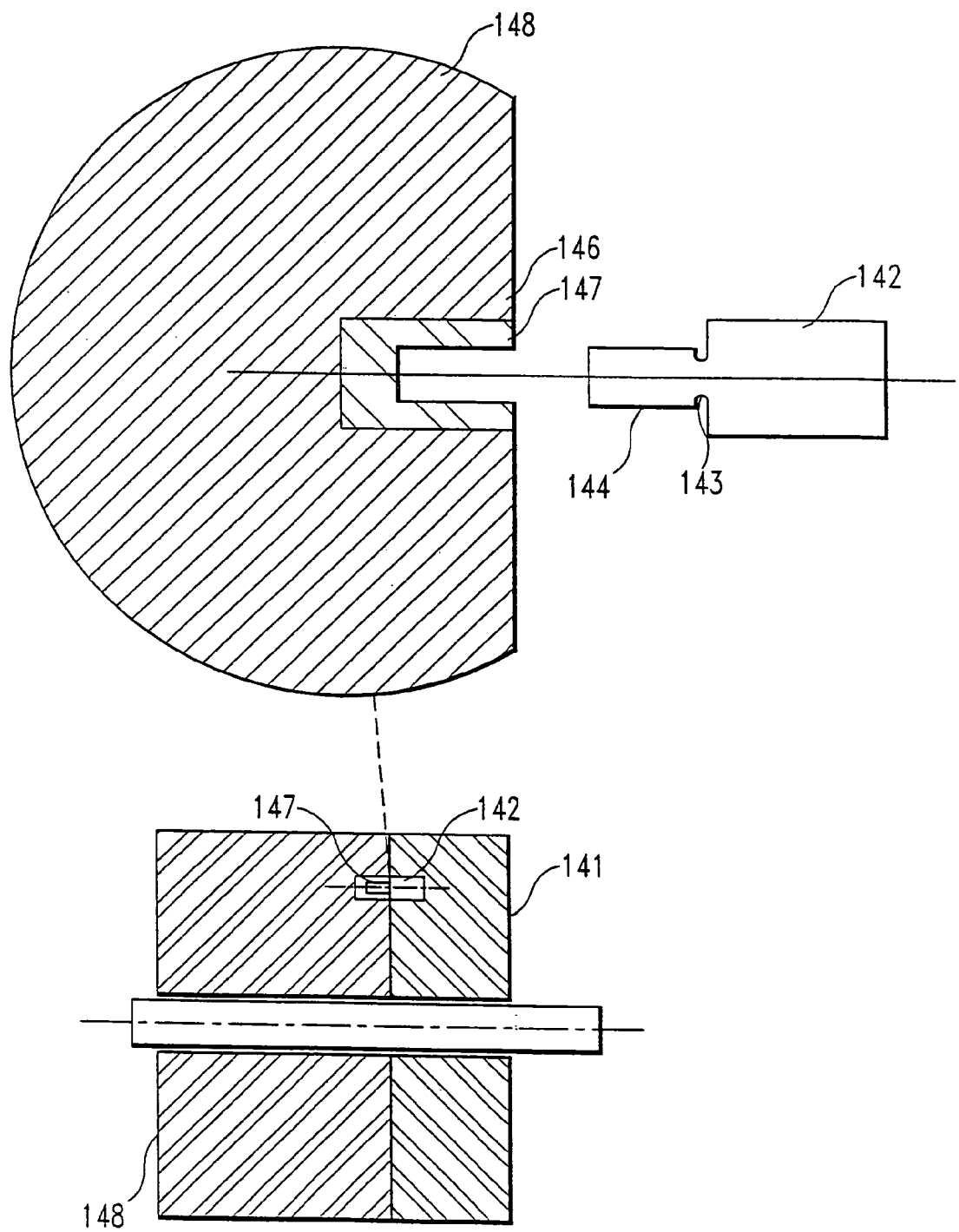
FIG. 5a shows the principle arrangement of a pin coupling as the clutch unit for an accelerator pedal with a torque motor according to FIGS. 1 and 2.
Figure 5B:
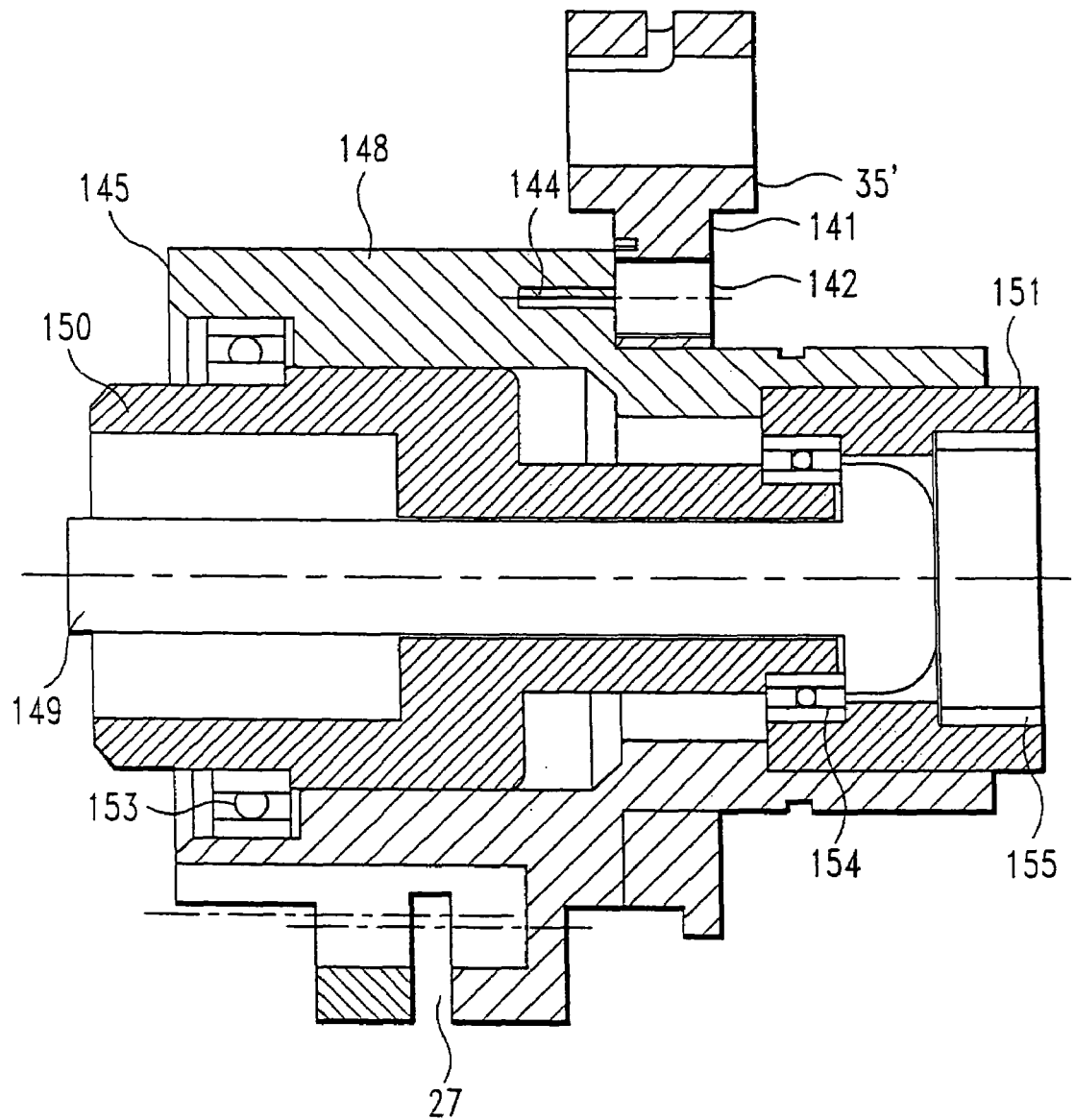
FIG. 5b is a schematic sectional view of a pin coupling for an accelerator pedal according to FIGS. 1 and 2.

FIGS. 5a and 5b show the clutch unit 140.

As shown particularly in the schematic sectional view of FIG. 5a, the clutch unit 140 is designed as a pin coupling. It includes a limp home object 141, which is located opposite to an actuation element 148. The limp home object 141 is connected to the actuation element 148 by a pin unit.

The pin unit consists of a pin body 142 connected to coupling pin element 144. An at least partially circumferential predetermined breaking point region 143 is inserted into the coupling pin element 144.

A female coupling element 147 is inserted in the actuation element 148 in a bushing opening 146. This coupling pin element 144 can be slid into this female coupling element.

Figure 5C:
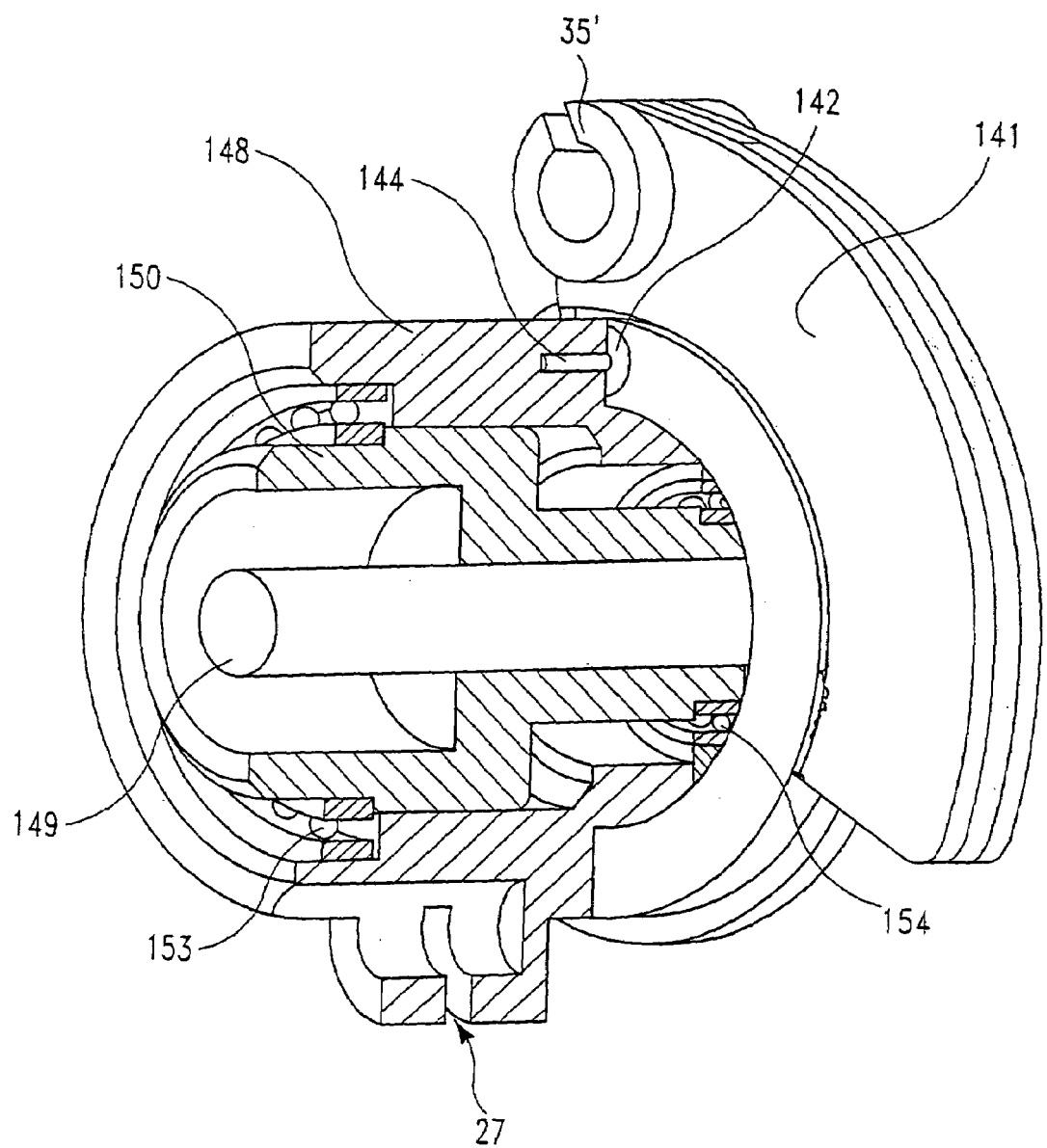
FIG. 5c is a partially open perspective presentation of a pin coupling according to FIG. 5b.

FIGS. 5b and 5c show an implementation of the pin coupling unit.

A cup object 150 is positioned within the actuation element 148. A cup ring support 153 is positioned between the actuation element and the cup object. A limp home object 141, attached to drive lever 35', is placed around the actuation element 148, which has an essentially cuplike configuration as well. The limp home object 141 is connected to the actuation element 148 with the aid of the pin body 142 and the coupling pin element 144.

A support pin element 149 that holds a holding ring support 154 against cup object 150, and holding ring 154, guides a support body 151. The support body 151 is supported by a closure element 155. This supports the clutch unit 140 in a fashion where it can be rotated.

Connected to the accelerator element 6 is the gas pedal lever element 5 as is shown particularly in FIG. 1. A motor peg 35 and a pedal peg 36 enable a moveable and direct, force-locked interaction with the actuation element 148 of the clutch device 140.

Figure 6B:
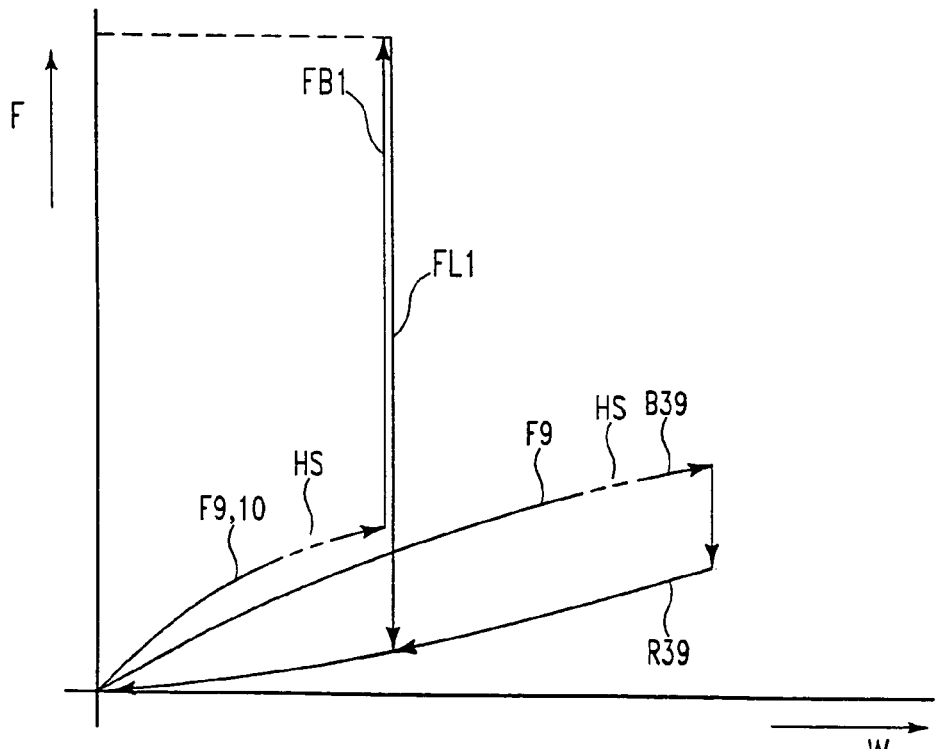
FIG. 6b is a schematic presentation of the profile of a pedal path with a jammed torque motor with a subsequent path corresponding to the de-coupling.

The operation of the smart accelerator pedal shall be described, particularly by using FIGS. 6a and 6b, where a pedal force F is shown in relation to the pedal path W.

By stepping on the accelerator pedal element 6, the pedal lever element 5 in a vehicle is actuated by the motorist. Elements 9.1, 9.2, 10.1, 10.2 and the damping element 27 assume the damping function. They oppose the pedal movement with a damping force F9, 10, as shown in FIG. 6a. This means, the stronger and more intensive the accelerator pedal element 6, and thus the gas pedal lever element 5, is actuated, the greater the damping force F9, 10 will be.

Before the motorist enters the highway, he enters the prescribed recommended speed of 130 km/h into the E2PROM. Vehicles traveling along with him may tempt him to exceed the prescribed speed limit of 130 km/h, the normal condition. The control sensor element, or a super-ordinate unit, senses this violation and passes this information on to the microcomputer unit 14. The microcomputer unit 14 compares the actual value with the nominal value and initiates the immediate activation of the torque motor 1. The torque motor 1 develops a torque motor force F1 with a linearly increasing effect, as shown in FIG. 6a.

Through the sudden increase in the damping force in the actuation movement B3, which now consists of the torque motor force F1 plus the damping force F9, 10, the motorist is very abruptly made aware of the violation of the normal condition. Through a brief reversal in the rotation of the torque motor 1, which becomes noticeable in a shaft at the transition from F9, 10 to F1, the motorist is additionally made aware of the violation of the normal condition. If he still does not desist from the continued actuation of the accelerator pedal element, and thus of the pedal lever element 5, he will have to overcome the sum of both forces F1 plus F9, 10. A dashed section HS is located within the curve section F9, 10. Here, an additional error, e.g., a low tire pressure, may be signaled by a brief tremor, e.g., a high-frequency signal. This type of signaling is also possible at the other curve sections when errors occur.

This leads to him releasing the foot from the accelerator pedal element 6 after a short period. This inevitably reduces the speed. This change, in turn, is sensed. The torque motor shuts off as soon as the normal condition is reached, and the two damper elements 9, 10 oppose the actuation force.

If the foot is entirely removed from the accelerator pedal element 6, which then is returned by the spring elements, the damping force F9, 10 of the damper elements only partially opposes this retraction movement, such that a curve profile results, which is shown in FIG. 5 by the pedal retraction movement R3.

The effect of the clutch unit 40 is shown in FIG. 6b. The driver actuates the accelerator pedal element 6. Pressing down the gas pedal lever element 5 (cf. particularly FIG. 2c) moves the clutch unit 40, the torque motor 1 and the two cables 11, 12. As has been mentioned previously, the damper elements oppose this actuation movement B39 with the damping force F9, 10.

Due to a defect, the torque motor suddenly stops. Through the blocking force FB1, it is now no longer possible to continue to move the accelerator pedal element 6. The movements of the accelerator pedal element can no longer be transferred to the damper flap unit. The vehicle is unfit to drive.

However, the driver has the possibility to make the vehicle moveable again. By generating a separation force FL1 of about 150 N, the limp home disc 41 and the actuation element 48 are separated through a stronger actuation of the accelerator pedal element 6. The separation force overcomes the force of the clutch spring unit 47 and leads to a shifting of the limp home disc 41 in relation to the actuation element 48. The limp home disc 41 and the actuation element 48 remain in this new position to one another due to the limp home tooth system 42 and the actuation tooth system 46. If the accelerator pedal element 6 is now released, the clutch cable 11 will be able to reset the clutch unit 40 with the two elements 41 and 48. The motor cable 12 sags in this case. The accelerator pedal element 6 can now be moved within the sag length to the taut position of the motor cable 12. Only the damping force F9 of the two spring elements 9.1 and 9.2 and the damper element 27 opposes the actuation force during the actuation movement B39. When the pedal is released, only the elements 9.1, 9.2, 27, which are presented as pedal limp home retraction movement due to the pedal retraction movement R39, oppose the retraction movement. Since the accelerator pedal element 6 can again move freely, the vehicle is again ready to drive and can be driven to a shop with reduced speed. There, at least the defective torque motor 1 can be removed and replaced with a new one.

The effect of the clutch unit 140 can be seen based on FIG. 6b as well. Up to the jamming of the torque motor 1, the accelerator pedal element is actuated in the same manner as with the clutch unit 40.

Here too, the driver has the capability of getting the vehicle ready to drive by generating a separation force FL1.

Through the sudden actuation of the accelerator pedal element 6, the motion force is transferred to the limp home object 141 as separation force FL1. This separation force FL1 ensures that the coupling pin element of the pin body breaks at the predetermined breaking opening. This separates the limp home object 141 from the actuation element 148, canceling out the blocking force FB1. Due to the jammed motor, the actuation element 148 holds the cable 12 in this newly assumed position.

However, the limp home object 141 can be rotated around the jammed actuation element with the aid of the clutch cable 11. The accelerator pedal element can again be moved freely. Only the damping force F9 of the two spring elements 9.1 and 9.2 and the damper element 27 opposes the actuation force during the actuation movement B39. When the pedal is released, only the elements 9.1, 9.2 and 27, which are presented as pedal limp home retraction movement due to the pedal retraction movement R39, oppose the retraction movement. Since the accelerator pedal element 6 can again move freely, the vehicle can be driven to a shop with reduced speed. There, the defective torque motor can be removed and replaced with a new one.

The clutch unit 140 can be regenerated as well. To do this, the pin body 142 must be pulled out of the limp home object 141 and the sheared coupling pin element 144 pulled out of the bushing opening. Then, a new pin body 142 is inserted in the limp home object 141, and the entire limp home object is again slid onto the actuation element 148. In doing so, the coupling pin element 144 again engages in the female coupling element 147. The again complete unit of the smart accelerator pedal is installed in the vehicle. After only a short repair time, the vehicle is again ready to leave the shop.

There has thus been shown and described a novel, smart Accelerator Pedal which fulfills all the objects and advantages sought therefore. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An accelerator pedal device having a base unit for attachment to a motor vehicle and comprising:
   (a) a foot pedal element rotatably connected to the base unit,
   (b) at least one retraction unit attached to the base unit for retracting the pedal element after it is pressed by a user's foot,
   (c) a motor unit releaseably connected to the pedal element and attached to the base unit for applying a counterforce to the pedal element in opposition to a force applied by the user's foot,
   (d) a clutch unit attached to the base unit and mechanically connected between the motor unit and the pedal element, forming the releaseable connection therebetween, for preventing application of the counterforce in an emergency condition said clutch unit comprising an actuation element and a limp home object, where said motor unit is connected to said limp home object and said pedal element is connected to said actuation element, and
   (e) a pedal sensor element connected to said actuation element for producing an electronic signal representing the position of said pedal element.

2. A device as set forth in claim 1, wherein the retraction unit comprises at least one clutch cable and one motor cable, and the pedal element is mechanically connected to the clutch cable and the motor unit to the motor cable such that the motor cable is de-coupled should the motor unit jam.

3. A device as set forth in claim 1, wherein the pedal element comprises an accelerator pedal element connected to rotate a damper element about an axis of rotation, wherein the clutch unit, connected to a motor cable, is located at the axis of rotation, and wherein a rotor of the motor unit is connected to the damper element by the motor cable.

4. A device as set forth in claim 1, wherein the clutch unit is selected from the group consisting of a locking clutch, a pin coupling, a motor clutch, a multi-plate clutch and a separator clutch.

5. A device as set forth in claim 1, wherein the actuation element includes an actuation tooth system, and wherein the limp home object includes a limp home disc with a limp home tooth system which engages the actuation tooth system.

6. A device as set forth claim 5, wherein said actuation element and said limp home disc are rotatable about a sensor shaft.

7. A device as set forth in claim 6, wherein the pedal sensor element is positioned on the sensor shaft.

8. A device as Bet forth in claim 5, wherein the actuation element and the limp home disc are pressed together by a clutch spring unit.

9. A device as set forth in claim 8, wherein the motor unit, and the clutch unit are at least partially encased by a floor housing element forming the base unit that closes at least partially with a floor plate.

10. A device as set forth in claim 5, wherein the retraction unit comprises a clutch cable and a motor cable, and the clutch cable is connected to the actuation element and the motor cable to the limp home disc.

11. A device as set forth in claim 1, further comprising a control unit connected to the sensor element for controlling the motor unit.

12. A device as set forth in claim 1, wherein the motor unit is a torque motor.

13. A device as set forth in claim 12, wherein the torque motor is a twin torque motor.

14. An accelerator pedal device having a base unit for attachment to a motor vehicle and comprising:
   (a) a foot pedal element rotatably connected to the base unit,
   (b) at least one retraction unit attached to the base unit for retracting the pedal element when it is pressed by a user's foot,
   (c) a motor unit releaseably connected to the pedal element and attached to the base unit for applying a counterforce to the pedal element in opposition to a force applied by the user's foot, and
   (d) a pedal sensor element for producing an electronic signal representing the position of said pedal element, wherein the retraction unit includes at least one clutch cable and one motor cable, with the pedal element mechanically connected to the clutch cable and the motor cable connected between the motor unit and means for preventing application of the counterforce in an emergency condition.

15. A device as set forth in claim 14, wherein said means for preventing application of the counterforce includes a clutch unit mechanically connected between the motor unit and the pedal element.

16. A device as set forth in claim 14, further comprising a clutch device comprising a limp home object and an actuation element that are connected by at least one pin unit, wherein the motor cable is connected to the limp home object, and the pedal element is connected to the actuation element.

17. A device as set forth in claim 16, wherein the pin unit is provided with a predetermined breaking point region.

18. A device as set forth in claim 17, wherein the pin unit comprises a pin object connected to a coupling pin element with an at least partially circumferential predetermined breaking point region located therebetween.

19. A device as set forth in claim 18, wherein the pin object is positioned within the limp home object and the coupling pin element within the actuation element.

20. A device as set forth in claim 18, wherein the actuation element further comprises a female coupling element, located where the coupling pin element is to be inserted.

21. A device as set forth in claim 16, wherein the actuation element ends in a second sensor shaft that is connected to the pedal sensor element.

22. A device as set forth in claim 16, further comprising a cup object and a support body, within the actuation element, and a limp home object adjacent the actuation element.

23. A device as set forth in claim 14, wherein the clutch cable is guided via a first damper element and the clutch cable and the motor cable are connected to said at least one retraction unit by a spring element, said retraction unit acting as a second damper element.

24. An accelerator pedal device having a base unit for attachment to a motor vehicle and comprising:
(a) a foot pedal element rotatably connected to the base unit,
(b) at least one retraction unit attached to the base unit for retracting the pedal element after it is pressed by a user's foot,
(c) a motor unit releaseably connected to the pedal element and attached to the base unit for applying a counterforce to the pedal element in opposition to a force applied by the user's foot,
(d) a clutch unit attached to the base unit, and mechanically connected between the motor unit and the pedal element for preventing application of the counterforce in an emergency condition, and
(e) a pedal sensor element for producing an electronic signal representing the position of said pedal element, wherein the retraction unit includes at least one clutch cable and one motor cable, and the pedal element is connected to the clutch cable and the motor cable is connected between the motor unit and the clutch unit.

* * * * *